(12) United States Patent
Rusakov et al.

(10) Patent No.: US 8,099,596 B1
(45) Date of Patent: Jan. 17, 2012

(54) SYSTEM AND METHOD FOR MALWARE PROTECTION USING VIRTUALIZATION

(75) Inventors: Vyacheslav E. Rusakov, Moscow (RU); Alexander V. Shiryaev, Moscow (RU)

(73) Assignee: Kaspersky Lab Zao, Moscow (RU)

(*) Notice: Subject to any disclaimer, the term of this patent is extended or adjusted under 35 U.S.C. 154(b) by 0 days.

(21) Appl. No.: 13/174,247

(22) Filed: Jun. 30, 2011

(51) Int. Cl.
*G06F 21/00* (2006.01)

(52) U.S. Cl. ............ 713/164; 726/30; 726/28; 713/187; 713/165; 713/166; 713/167; 380/200; 380/242; 718/100

(58) Field of Classification Search .................. 713/164, 713/187; 380/200–242; 726/28, 30; 718/100
See application file for complete search history.

(56) References Cited

U.S. PATENT DOCUMENTS

| | | | | |
|---|---|---|---|---|
| 5,956,710 | A * | 9/1999 | Yarom | 1/1 |
| 6,775,780 | B1 | 8/2004 | Muttik | |
| 7,213,153 | B2 * | 5/2007 | Hollander et al. | 713/187 |
| 7,376,971 | B2 * | 5/2008 | Pastorelli et al. | 726/26 |
| 7,398,389 | B2 * | 7/2008 | Teal et al. | 713/164 |
| 7,478,237 | B2 * | 1/2009 | Costea et al. | 713/164 |
| 7,487,548 | B1 * | 2/2009 | Conover | 726/26 |
| 7,490,356 | B2 * | 2/2009 | Lieblich et al. | 726/25 |
| 7,530,106 | B1 | 5/2009 | Zaitsev et al. | |
| 7,591,015 | B2 * | 9/2009 | Cargille et al. | 726/18 |
| 7,614,084 | B2 | 11/2009 | Monastyrsky et al. | |
| 7,644,271 | B1 * | 1/2010 | Cherepov et al. | 713/164 |
| 7,765,410 | B2 * | 7/2010 | Costea et al. | 713/188 |
| 7,765,595 | B2 * | 7/2010 | Focke et al. | 726/22 |
| 7,996,682 | B2 * | 8/2011 | Schutz et al. | 713/182 |
| 7,996,836 | B1 * | 8/2011 | McCorkendale et al. | 718/1 |
| 2004/0006706 | A1 * | 1/2004 | Erlingsson | 713/200 |
| 2004/0255160 | A1 * | 12/2004 | Stamos et al. | 713/201 |
| 2007/0016914 | A1 * | 1/2007 | Yeap | 719/328 |
| 2009/0300307 | A1 | 12/2009 | Carbone et al. | |
| 2010/0024036 | A1 | 1/2010 | Morozov et al. | |
| 2010/0031360 | A1 * | 2/2010 | Seshadri et al. | 726/24 |
| 2010/0192224 | A1 | 7/2010 | Ferri et al. | |
| 2010/0211663 | A1 * | 8/2010 | Barboy et al. | 709/223 |
| 2010/0318992 | A1 * | 12/2010 | Kushwaha et al. | 718/1 |

* cited by examiner

*Primary Examiner* — Farid Homayounmehr
(74) *Attorney, Agent, or Firm* — Arent Fox LLP; Michael Fainberg (57) ABSTRACT

Disclosed are systems, methods and computer program products for protecting applications deployed on a host computer from malware using virtualization. An exemplary malware protection system may include a kernel-level driver configured to intercept system calls addressed to an object of a protected application. The system also includes an analysis engine configured to determine if there are security rules associated with one or more of the intercepted system call, the object of the protected application, and the actions allowed on the object of the protected application. The security rules indicate whether the system call is allowed or not allowed to be executed on the host computer. If there is no security rule associated with the system call, the system call is executed in a secure execution environment of the host computer using a virtual copy of the object of the protected application.

17 Claims, 10 Drawing Sheets

Fig. 10

SYSTEM AND METHOD FOR MALWARE PROTECTION USING VIRTUALIZATION

TECHNICAL FIELD

The present invention relates generally to the field of computer security and, more specifically, to systems, methods and computer program products for protecting applications deployed on a host computer from malware using virtualization.

BACKGROUND

Due to fast proliferation and evolution of malware, such as viruses, worms, Trojans, and other types of computer threats, it becomes harder for computer security specialists to keep track of newly emerging threats even using automated malware detection means. Security concerns are even higher when security of confidential or secret personal or corporate information must be protected. Some types of malware are specifically designed to attack computers and applications deployed thereon in order to collect confidential or secret user and system information. Therefore, security applications, such as antivirus programs and firewalls, must be configured to protect critical system and application objects from unauthorized access.

One mechanism for system protection from malware is "sandboxing", in which untrusted programs are executed in a secure virtual environment. The execution of a program can be limited to exclude access to the critical areas or processes of the host system or applications deployed thereon. However, known sandboxing techniques have limitations. For example, they may be ineffective when the host system is already infected by the malware. Also, they do not allow filtering of system calls made from the untrusted program based on types of operations other than read/write operations and analysis of requests using different malware detection algorithms. Accordingly, there is need for an improved sandboxing mechanism for protection of a host computer and applications deployed thereon from malware.

SUMMARY

Disclosed are systems, methods and computer program products for protecting applications deployed on a host computer from malware using virtualization. In one example embodiment, a malware protection system comprises a kernel-level driver configured to intercept system calls addressed to an object of a protected application. The system further includes an analysis engine configured to determine if there is a security rule associated with one or more of the intercepted system call, the object of the protected application, and the actions allowed on the object of the protected application, wherein the security rule indicates at least whether the system call is allowed to be executed or not allowed to be executed on the host computer. If there is a security rule indicating that the system call is allowed to be executed on the host computer, the analysis engine instructs the host computer to execute the system call. If there is a security rule indicating that the system call is not allowed to be executed on the host computer, the analysis engine instructs the host computer to block execution of the system call. If there is no security rule associated with the system call, the analysis engine instructs a handler of a secure execution environment of the host computer to execute the system call in the secure execution environment using a virtual copy of the object of the protected application.

In one example embodiment, a method for protecting applications deployed on a host computer comprises: intercepting, at the kernel level of the host computer, system calls addressed to an object of a protected application deployed on the host computer; determining if there is a security rule associated with one or more of the intercepted system call, the object of the protected application, and the actions allowed on the object of the protected application, wherein the security rule indicates at least whether the system call is allowed to be executed or not allowed to be executed on the host computer; if there is a security rule indicating that the system call is allowed to be executed on the host computer, executing the system call on the host computer; if there is a security rule indicating that the system call is not allowed to be executed on the host computer, blocking execution of the system call on the host computer; and if there is no security rule associated with the system call, executing the system call in a secure execution environment using a virtual copy of the object of the protected application.

The above simplified summary of example embodiment(s) serves to provide a basic understanding of the invention. This summary is not an extensive overview of all contemplated aspects of the invention, and is intended to neither identify key or critical elements of all embodiments nor delineate the scope of any or all embodiments. Its sole purpose is to present one or more embodiments in a simplified form as a prelude to the more detailed description of the invention that follows. To the accomplishment of the foregoing, the one or more embodiments comprise the features described and particularly pointed out in the claims.

BRIEF DESCRIPTION OF THE DRAWINGS

The accompanying drawings, which are incorporated into and constitute a part of this specification, illustrate one or more example embodiments of the invention and, together with the detailed description serve to explain their principles and implementations.

DETAILED DESCRIPTION OF EXAMPLE EMBODIMENTS

Example embodiments of the present invention are described herein in the context of systems, methods and computer program for protecting applications deployed on a host computer from malware using virtualization. Those of ordinary skill in the art will realize that the following description is illustrative only and is not intended to be in any way limiting. Other embodiments will readily suggest themselves to those skilled in the art having the benefit of this disclosure. Reference will now be made in detail to implementations of the example embodiments of the invention as illustrated in the accompanying drawings. The same reference indicators will be used to the extent possible throughout the drawings and the following description to refer to the same or like items.

Figure 1:
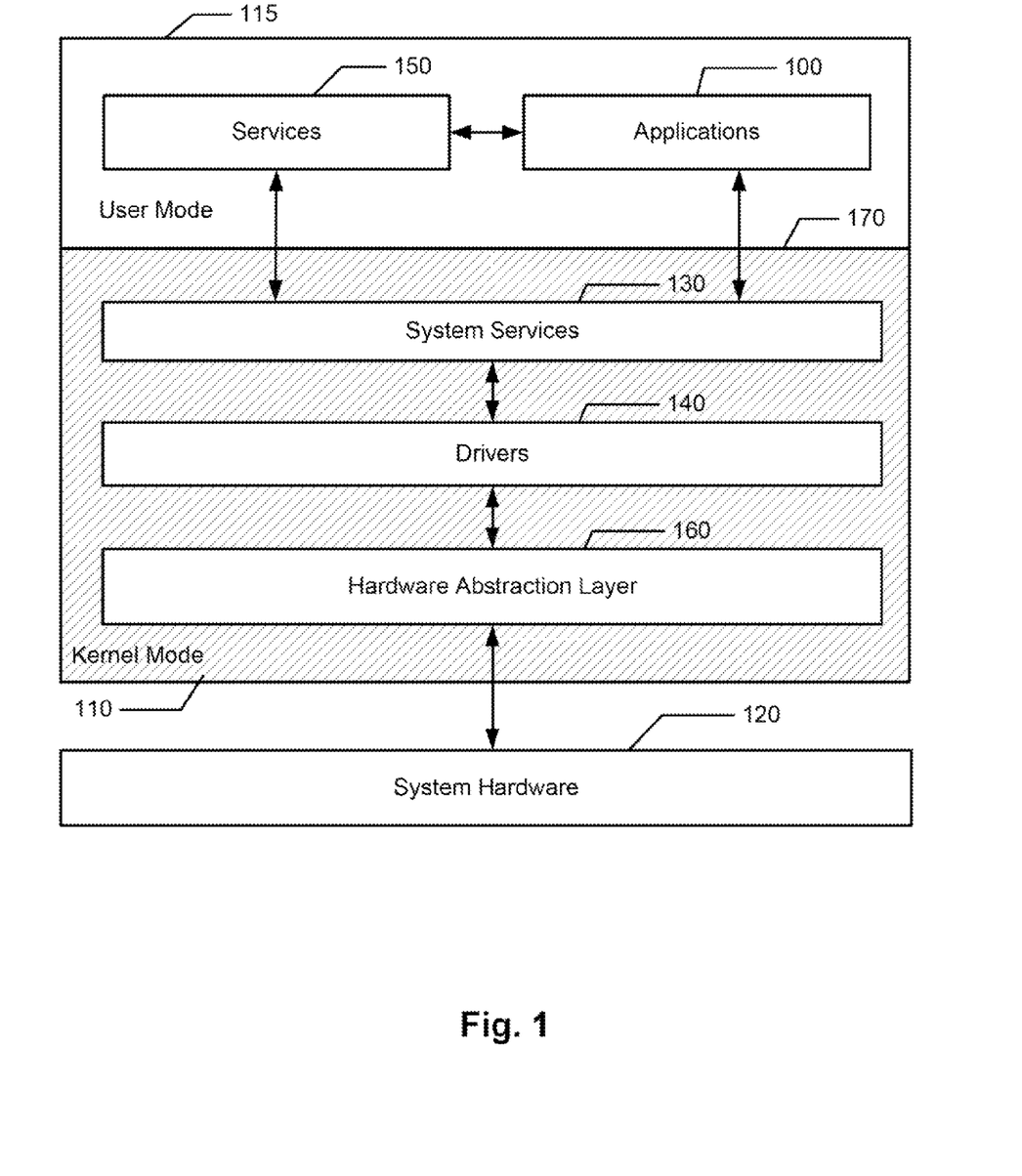
FIG. 1 illustrates schematic configuration of a host computer according to one example embodiment.
Figure 10:
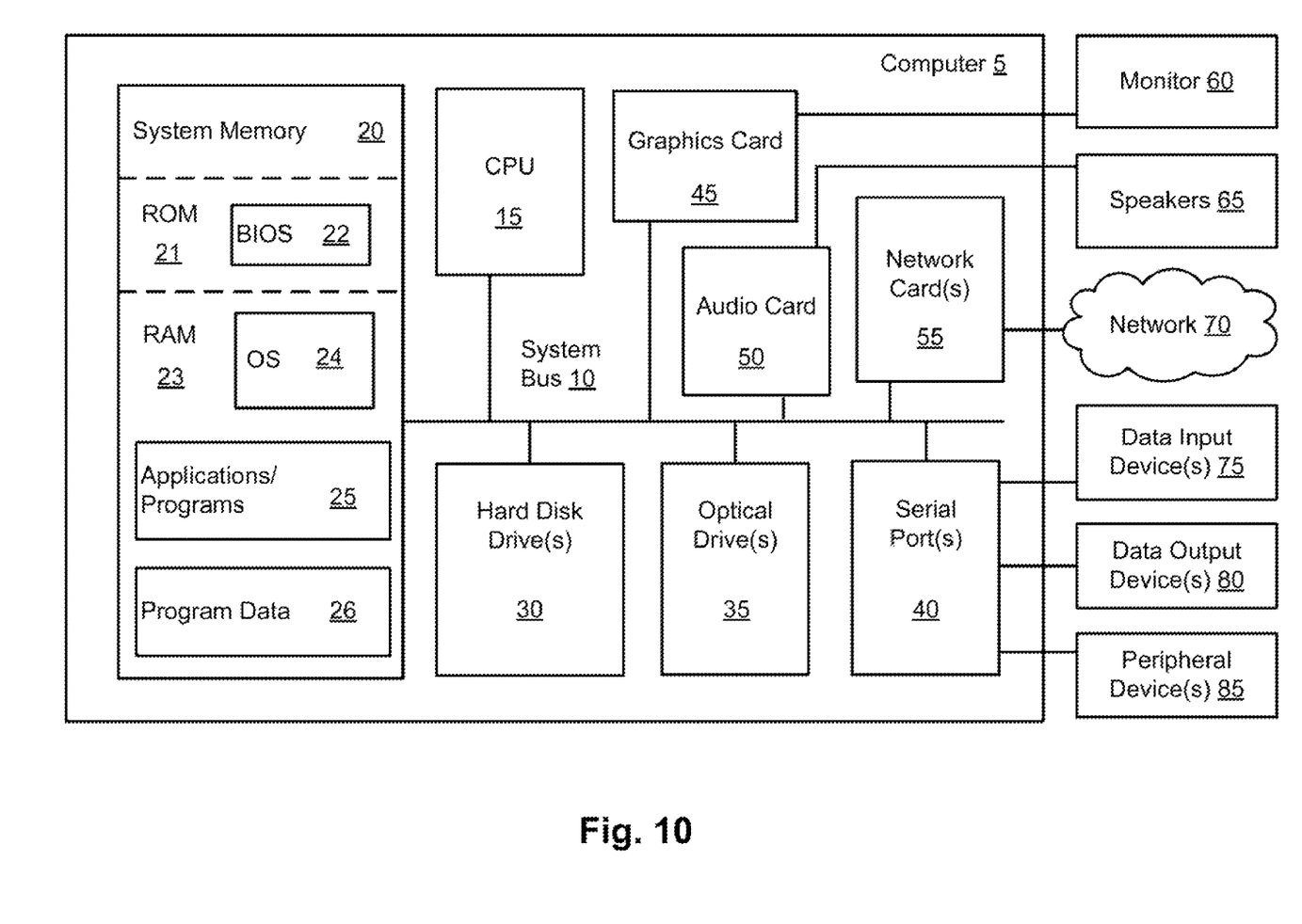
FIG. 10 illustrates a schematic diagram of a host computer according to one example embodiment.

FIG. 1 shows an example schematic configuration of a host computer which includes hardware 102, operating system 170 and applications/programs 100. A more detailed configuration of the host computer is shown in FIG. 10, which will be discussed in greater detail herein below. Generally, operating systems (OS) support several levels of privileges for executing programs and applications on the host computer. For example, Windows® OS supports two security modes: kernel mode 110 and user mode 115. Programs and applications 100 are typically deployed in the user mode 115, which increases the level of protection for the host computer against critical errors and, in particular, protects system services 130, drivers 140, and hardware abstraction layer 160 of the operating system 170 from access/modification by malware. The host computer may also include various user mode services 150, such as antivirus and other security services provided by the OS, which control the execution of user-mode applications 100 and monitor state of the host computer's software and hardware components.

Figure 2:
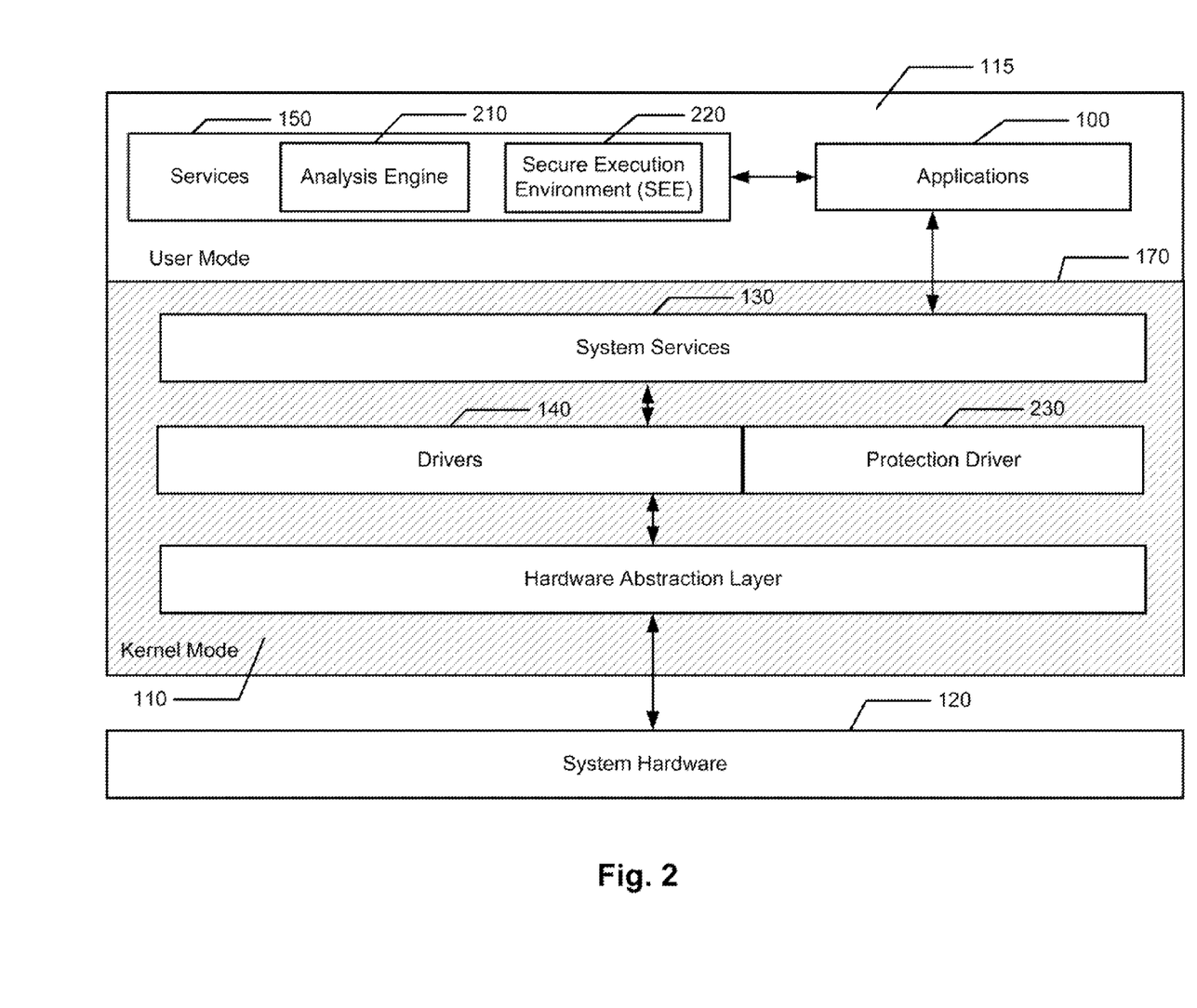
FIG. 2 illustrates an example implementation of a malware protection system deployed on the host computer according to one example embodiment.

FIG. 2 illustrates one example embodiment of a malware protection system deployed on the host computer. The malware protection system comprises a kernel-level protection driver 230, analytical engine 210 and secure execution environment (SEE) 220. In one example embodiment, the kernel-level protection driver 230 is configured to intercept system calls (e.g., read, write, load, create process, open network connection, etc.) directed to a user-mode application 100 and redirect them to a secure execution environment (SEE) 220. In the SSE 220, the request is analyzed by the analysis engine 210 to determine whether to block system call, allow its execution by the host computer, or execute the system call in the SEE 220 using virtual system components of the SEE 220 without any harm to the application 100 or host computer.

Figure 3:
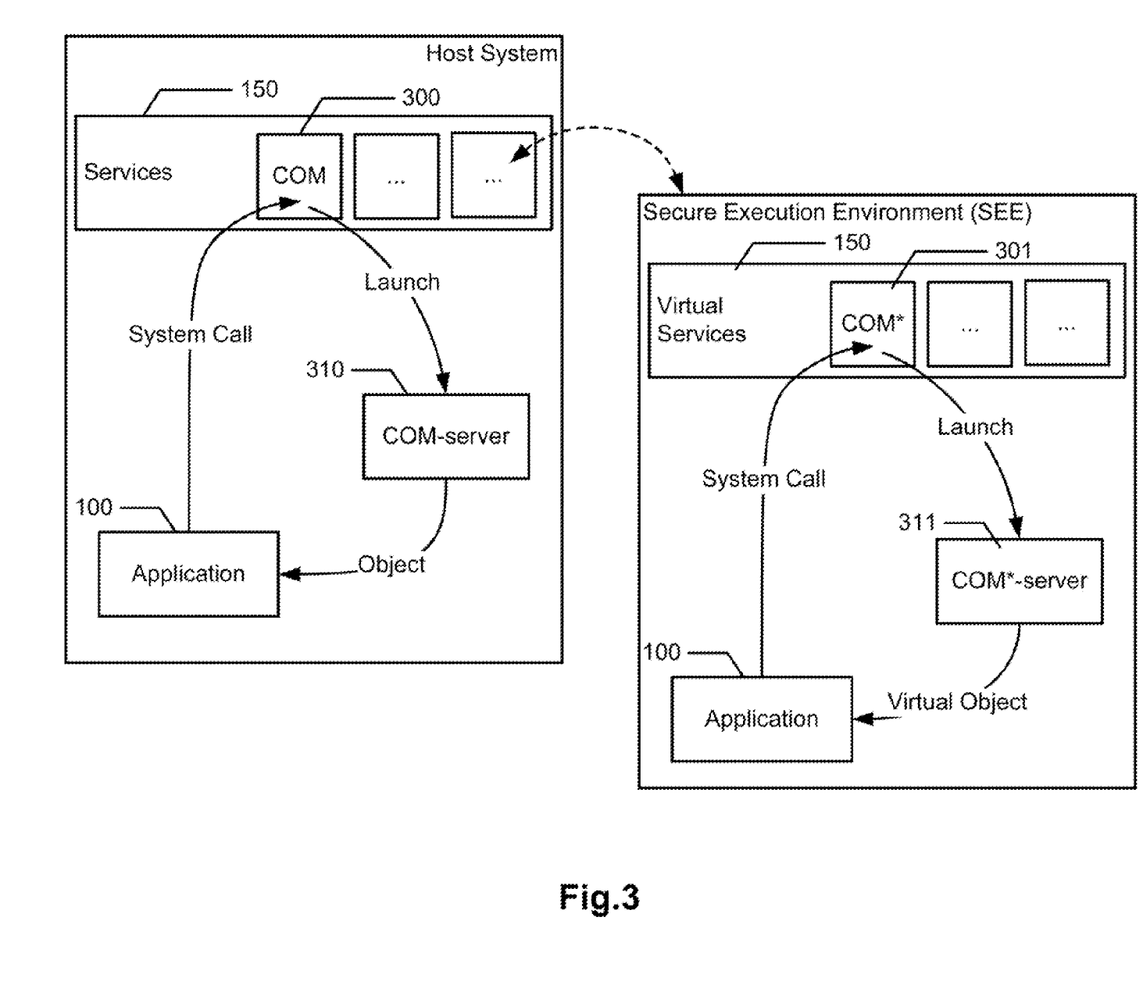
FIG. 3 illustrates an example of virtualization of a COM subsystem of the host computer according to one example embodiment.

In one example embodiment, SEE 220 may be implemented as user-mode service 150 that provides virtualization of components of the host computer. FIG. 3 shows an example of virtualization of a COM subsystem of the host computer which may be implemented in the SEE 220. Generally, the COM provides a model for reuse of system components, such as executable files or dynamic libraries, which can be called up from any program that supports the COM model. An example of such a program is Internet Explorer® and other browser. COM provides access to and control over a launched copy of such an application. Therefore, in one example embodiment, when a COM service 300 is addressed by a program launched on the host computer (which could be a malware), the system call may be redirected to a virtual copy of COM service 301 created in the SEE 220. Therefore, access to the COM objects of the operating system and other OS services does not take place directly. The COM virtual service does not differ from the original service. For example, when application 100 makes a system call, host system launches a COM server 310, which returns the object being requested to the application 100. When the system call from application 100 is redirected to the SEE 220, a virtual COM service 301 creates a virtual server 311 and returns a virtual object to the application 100.

Figure 4:
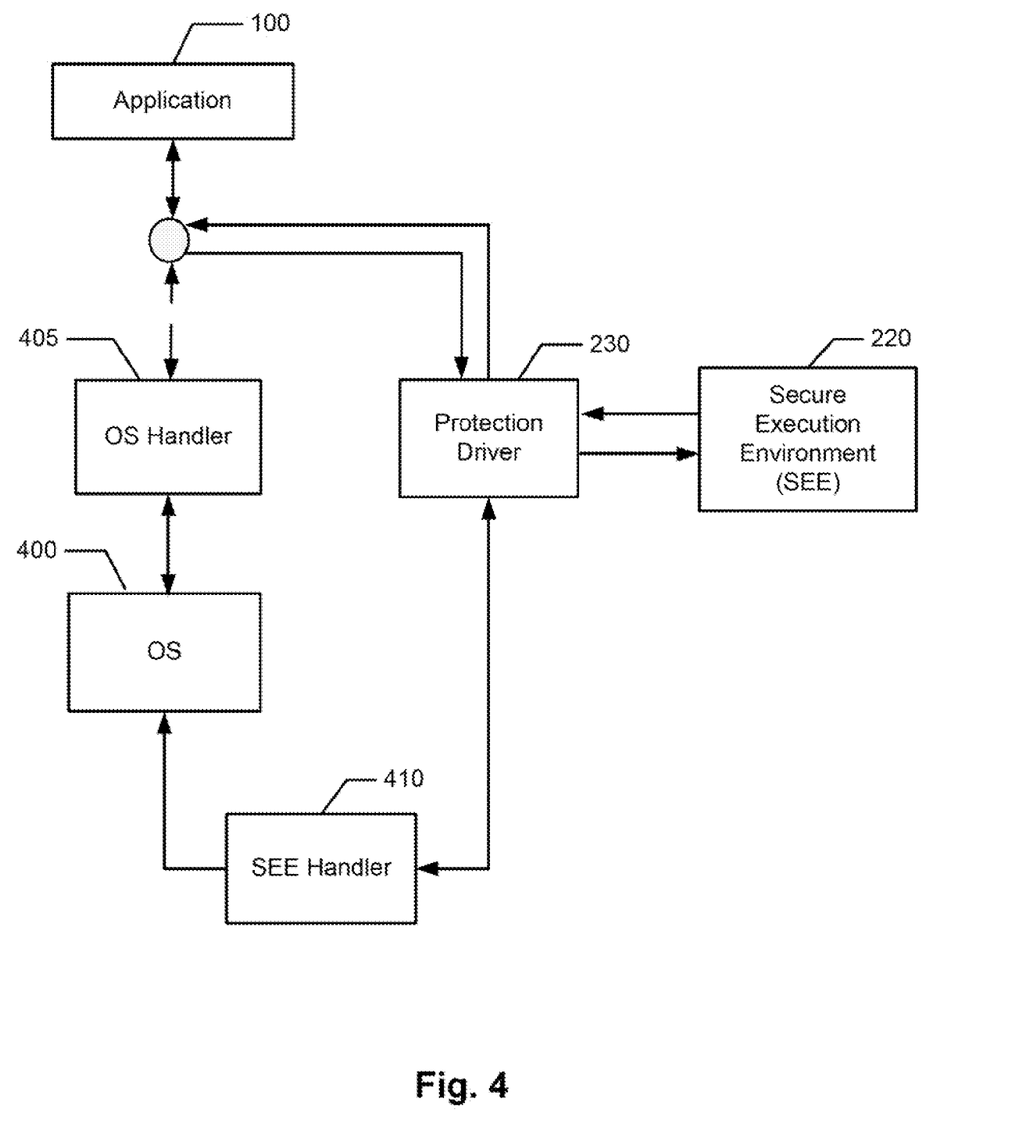
FIG. 4 illustrates diagram of operation of a secure execution environment of the malware protection system according to one example embodiment.

FIG. 4 shows a diagram of operation of secure execution environment (SEE) of the malware protection system according to one example embodiment. During execution on the host computer, application 100 may send a system call to the OS 400 where it has to be processed by the OS handler 405. The system call may be intercepted by the kernel-level protection driver 230 of the malware protection system and do not reach the OS handler 405. For example, the protection driver 230 may be configured to intercepted the following system calls: opening up a process/input; reading the process memory; direct access to the memory/disk; access to the file system, the registry and the objects of the OS kernel 400; requests to obtain privileges; and other system calls. After the interception, the protection driver 230 redirects the system call to the secure execution environment 220, where the system call may be executed by the SEE handler 410 using a plurality of virtual copies of components of the host computer.

Figure 5:
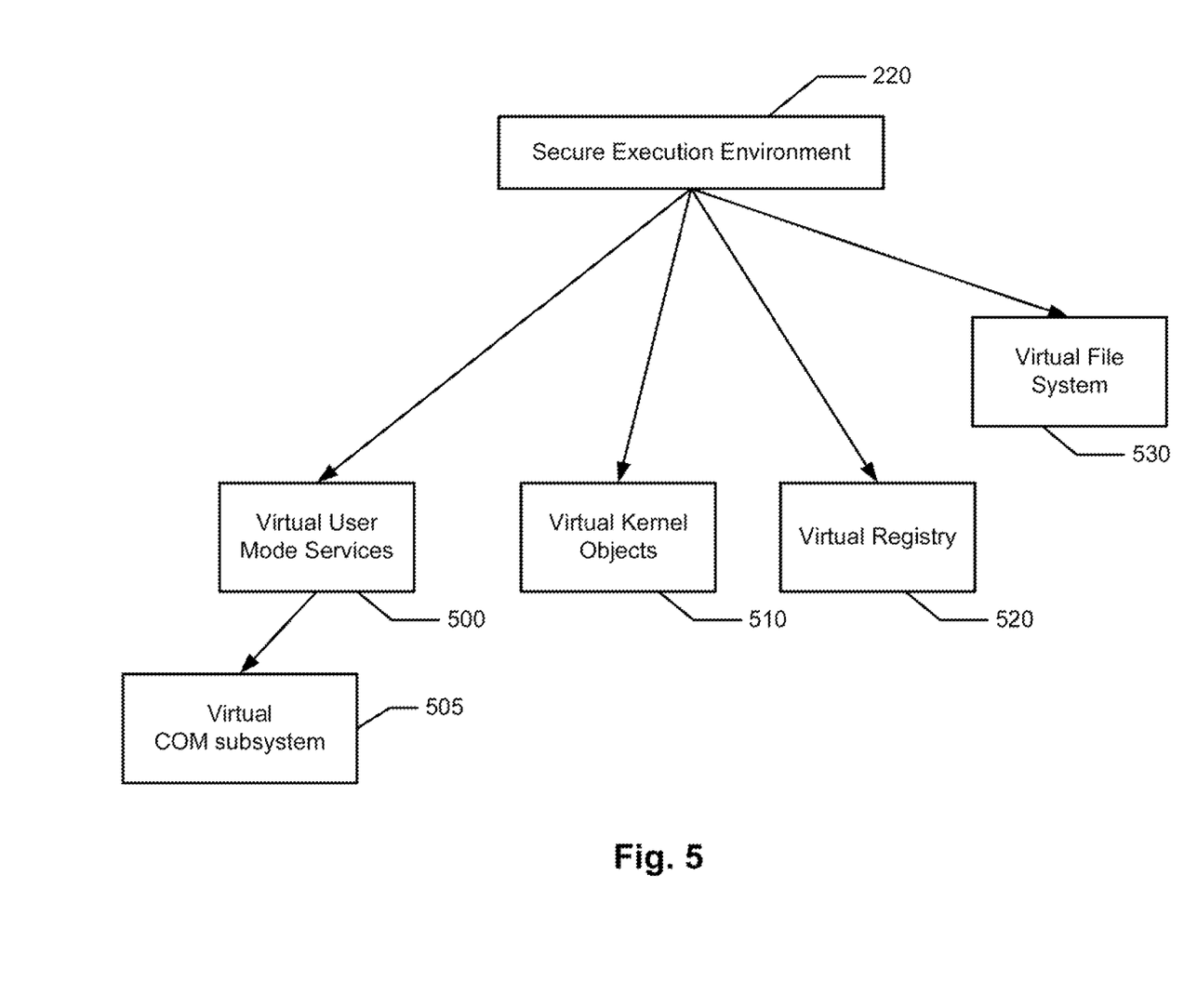
FIG. 5 illustrates a diagram of virtualized components of the secure execution environment according to one example embodiment.

The process of executing system calls by the SEE handler 410 depends on the level of detail with which the host computer is virtualized in the secure execution environment 220. For effective operation without errors, it is preferred, but not required, to create a virtual copy of the file system, the registry, and some OS services. FIG. 5 shows examples of virtual components of the host computer reproduced in the SSE 220. As shown, the SEE 220 may include virtual user mode services 500 and COM subsystem 505, virtual kernel objects 510 (e.g., port, pipe, event, mutex, section, semaphore), virtual registry 520, and virtual file system 530. Virtualization of system components may be performed on-the-fly, without reinstallation or reloading of the host computer because no changes in the kernel of the OS of the host computer are necessary.

The virtualization implies that changes that application 100 makes in the host computer are not actually performed. In other words, the original information in the host system (file or registry key) is not changed. Virtualization of a process is understood to be virtualization of its access to the objects of the OS, including its files and registry. Virtualization of an object presupposes the creation of its virtual copy, if this is necessary (access to the real object can also be provided). In one example embodiment, SEE handler 410 determines which software and hardware components need to be virtualized in the SEE 220 and executes the system call using the virtualized components. The real object is returned to the application 100, as a rule, during read operation only. The virtual files may be stored in a special directory, and the registry keys in a special branch of the registry. The other OS objects may be stored in RAM.

Figure 6:
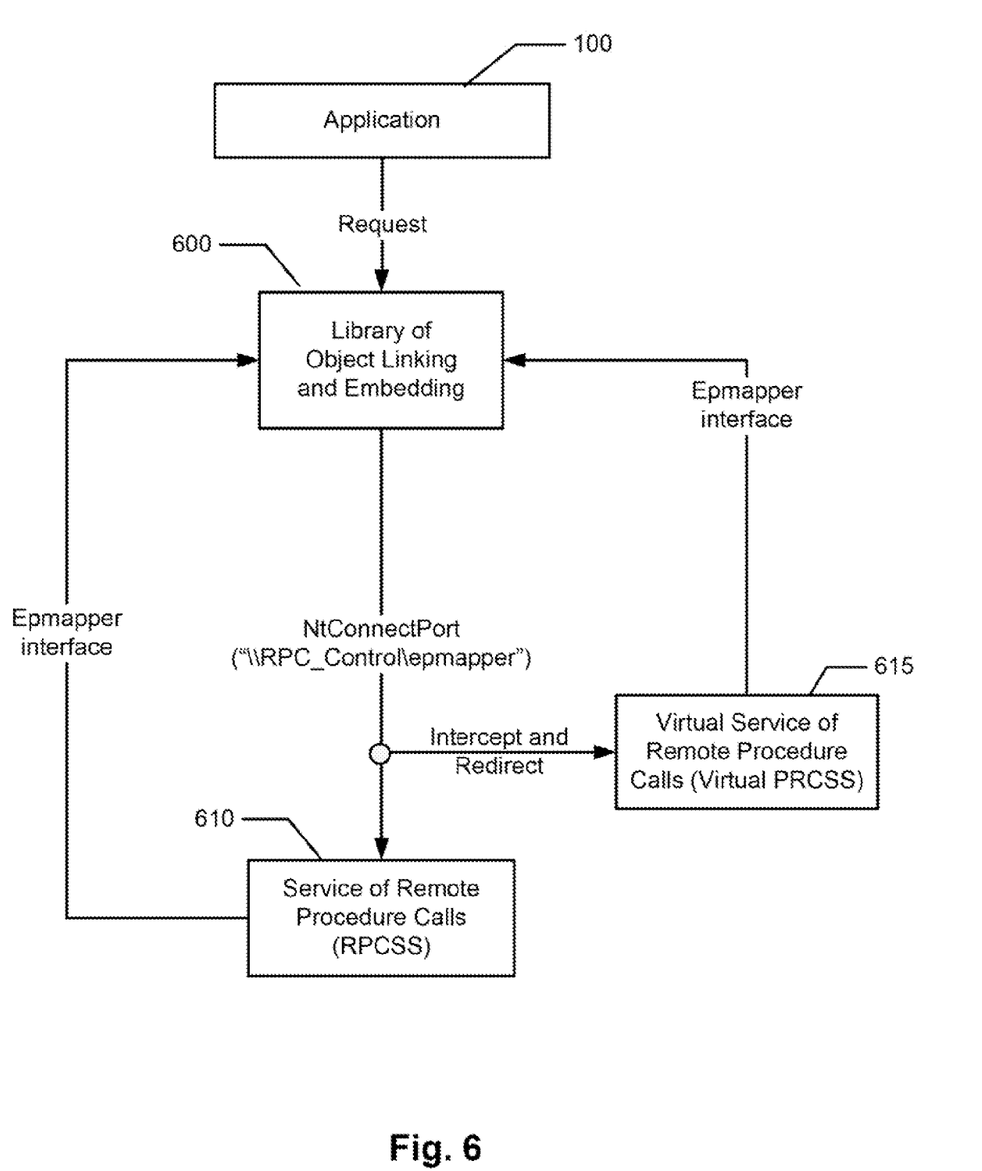
FIG. 6 illustrates a method for interception of local procedure calls by the malware protection system according to one example embodiment.

In one example embodiment, the protection driver 230 may be also configured to intercepts local procedure calls (LPC). This permits the malware protection system to isolate application 100 by changing the port names. FIG. 6 illustrates an example of such an interception. The application 100 sends a request for the creation of an object to the library of object linking and embedding 600 (OLE32.dll in the Windows® OS). This library calls up the function for establishing a connection to the port NtConnectPort ("\\RPC_Control\epmapper"), where "\\RPC_Control\epmapper" is the name of the port. This request is intercepted by the protection driver 230 and the port name is changed. After the substitution of the port name, the request does not go to the service for remote procedure call-up RPCSS 610 (in the Windows® OS), but to the virtual service for remote procedure call-up Virtual RPCSS 615 provided by the secure execution environment 220. The virtual service 615 returns the epmapper interface to the application 110 for further interaction with the secure execution environment 220.

The previous examples were considered with regard to the interaction of an application with the OS. Such examples reveal the possibility of protecting the OS from malware deployed on the host computer. However, virtualizing all the applications on a computer is an extremely resource-intensive task, and this is not expedient for solving the problem of protection of confidential information from malware. There is a limited set of applications on the computer that store, transmit, and receive information containing confidential data that should be protected. Such information includes personal correspondence, personal data, secret codes, passwords, credit card numbers, and other data. The virtualization of the applications and their interaction with other programs and the OS according to specified rules is a necessary layer of protection under the conditions of a constantly growing risk to the security of information. Therefore, the malware protection system permits applications containing confidential information to be cut off from malware without loss of functionality or reloading.

Since malware protection system in accordance with one example embodiment of the invention uses virtualization of the components and objects of the host computer and applications deployed thereon, the protection of the host computer from infections due to vulnerabilities and errors in the applications may be organized based of the following principles: (1) limiting access to protected objects, such as objects containing confidential data of the user; (2) protecting the host computer against changes: creating and making available copies of the object of the application launched in the secure execution environment in an attempt to modify objects on the host computer; and (3) protecting critical processes and services launched in the host computer from access on the part of an application launched in a secure execution environment, with the purpose of excluding leaks of malicious processes into the host computer.

In this case, the malware protection system is configured to analyze and filter in the secure execution environment system calls from applications to the objects (e.g., memory areas, files, processes, threads of execution) of the host computer and other applications deployed thereon. In addition, the malware protection system may analyze and filter system calls from the objects of the host computer to the applications executed in the secure execution environment.

In addition, the malware protection system provides the following advantages: protecting host computer against penetration of malware during application's access to the Internet; cleaning temporary files, visit logs, and other data that store the history of application's operation; protecting user data processed by the application being protected from unauthorized access of processes from the host computer; securing launch of programs from the applications being protected by automatically launching these programs in the secure execution environment.

Figure 7:
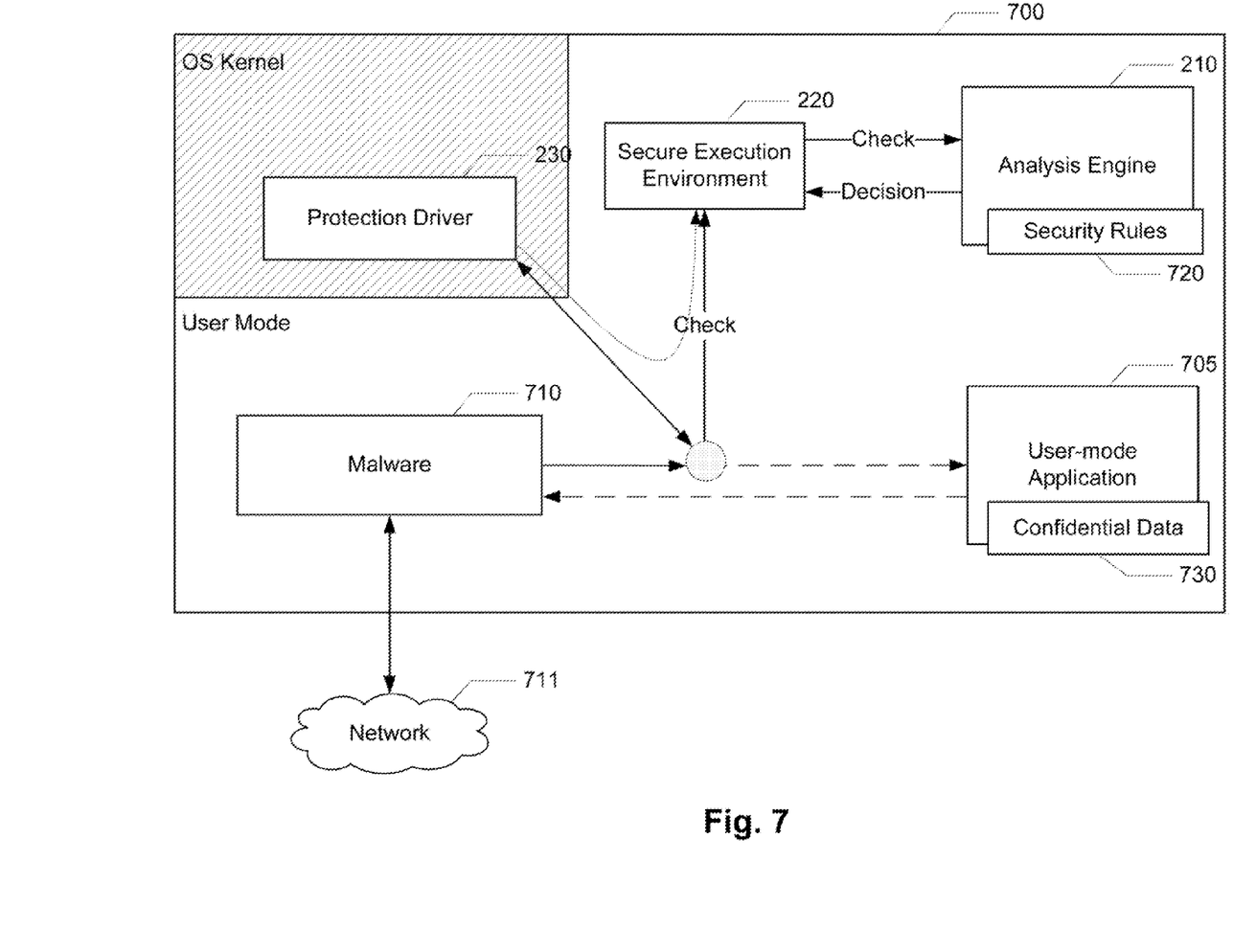
FIG. 7 illustrates a schematic diagram of operation the malware protection system according to one example embodiment.

FIG. 7 illustrates a schematic diagram of operation the malware protection system according to one example embodiment. A malware 710 deployed on host computer 700 executes an algorithm for stealing confidential information from the user-mode application 705, such as the Internet browser, banking application, communication application or other application that stores confidential user or system information. The malware 710 makes a system call to the operating system, such as a request to read memory of one or more objects (e.g., memory areas, files, processes, threads of execution, etc.) of the application 705. The system call may be intercepted by the kernel-level protection driver 230 of the malware protection system and redirected to the secure execution environment 220 of the malware protection system. The SSE 220 may collect all information related to the system call, such as the name of the program that made the call, type of system call (e.g., read, write, load, create process, open network connection, etc.), name of the program being called, the processes and memory areas being accessed by the system call, and other relevant information. The SEE 220 sends the collected information to analysis engine 210, which determines the nature of the system call and reaches a verdict weather to perform the system call, to block the system call, or to execute the system call using virtual system components in the SEE 220.

In one example embodiment, the analysis engine 210 is an expert system of security rules 720 which analyzes the intercepted system call (e.g., the type of system call), the object of the system call, the statistics of system calls from the malware 710, the attributes and behavior of the malware 710 and other information to determine if the system call should be performed or blocked by the malware protection system. One example of security rules is the exclusion of access depending on the object type, designated in the example below with angular brackets:

If {access to <object of the OS kernel>}, then {block access}

Depending on the verdict, the system call is either blocked, sent to the OS handler 405 without modification, or forwarded to the SEE handler 410 for execution in the SEE 220. The requests to the processes, data, and application memory are filtered according to the rules, which enhance the protection of access to the confidential data 730 of the user-mode application 705.

Figure 8:
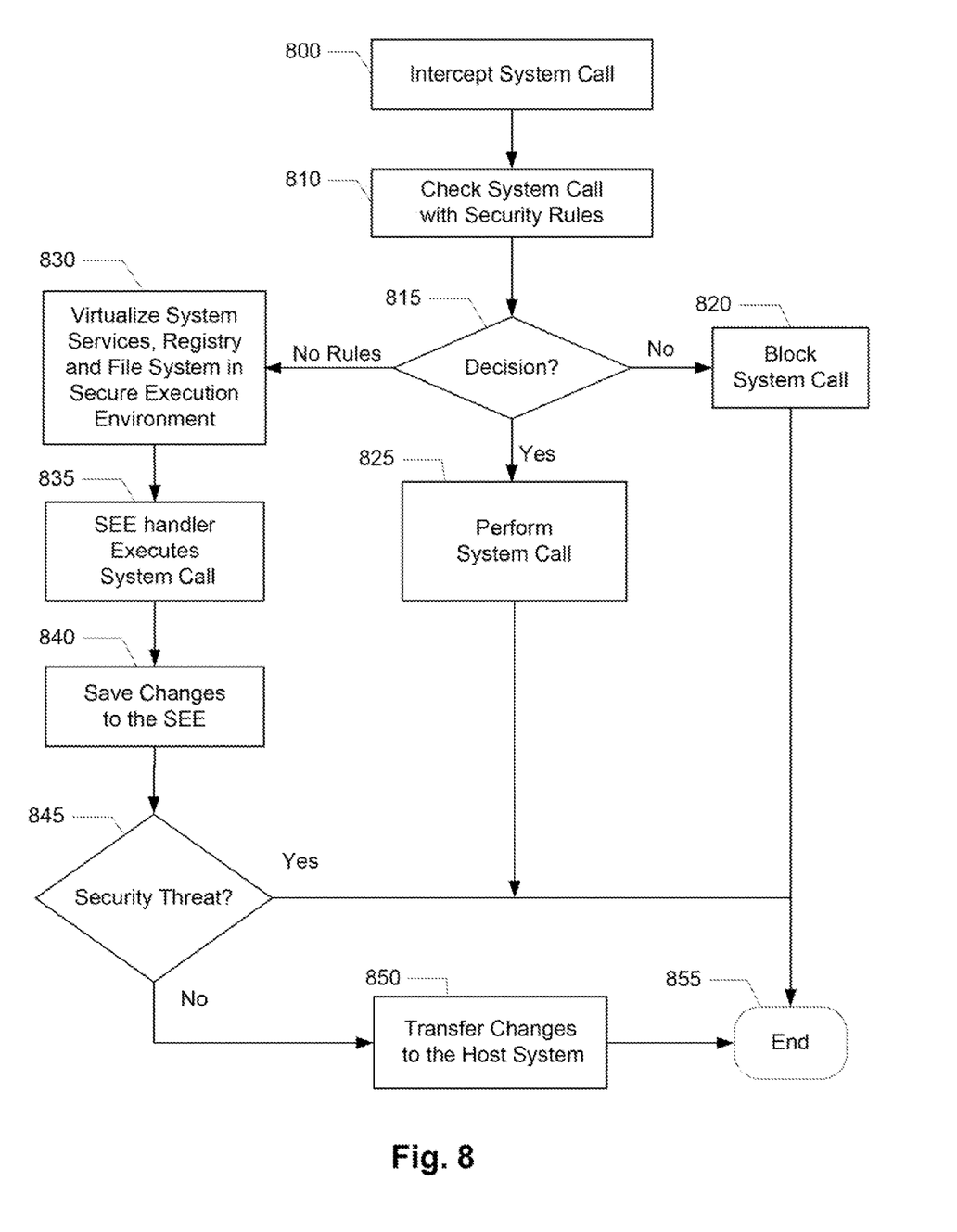
FIG. 8 illustrates algorithm of operation of the malware protection system according to one example embodiment.

FIG. 8 illustrates algorithm of operation of the malware protection system according to one example embodiment. At step 800, the kernel-level protection driver intercepts a system call to (or from) a user-mode application (e.g., the memory of the application, its processes, the files of the application). At step 810, the system call is checked by analysis engine of the SEE for compliance with security rules and a decision how to process the system call is made at step 815: the system call is blocked at step 820 if it does not comply with the security rules (and an error message may be generated indicated that the system call is prohibited), the system call is performed at step 820 (sent to the OS handler) if it does not contain any threats, or execution of the system call is virtualized in the SEE at step 830 if no appropriate security rule was found. In particular, at step 830, the SEE hander creates in the SEE all necessary virtual copies of system components, such as virtual system services, registry, file system, etc., necessary for virtual execution of the system call. The actions performed within the SEE may be stored at step 840 in a data structure and assessed at step 845 if they possess any threat to the security of the application (or its data, processes, etc.) to which the system call was directed. In one example embodiment, the analysis at step 845 may include a heuristic analysis of one or more intercepted system call(s) against behavior patterns of known malicious programs, as disclosed for example in a commonly owned U.S. Pat. No. 7,614,084 entitled "System and Method for Detecting Multi-Component Malware", which is incorporated by referenced herein. In other example embodiments, the analysis at step 845 may include malware signature matching, behavior analysis or other known malware detection technique. If no threat has been detected, the changes to the objects of the SEE may be applied at step 850 to the host computer. Otherwise, the changes to the SEE are not applied to the host, and the process is terminated at step 855.

Figure 9:
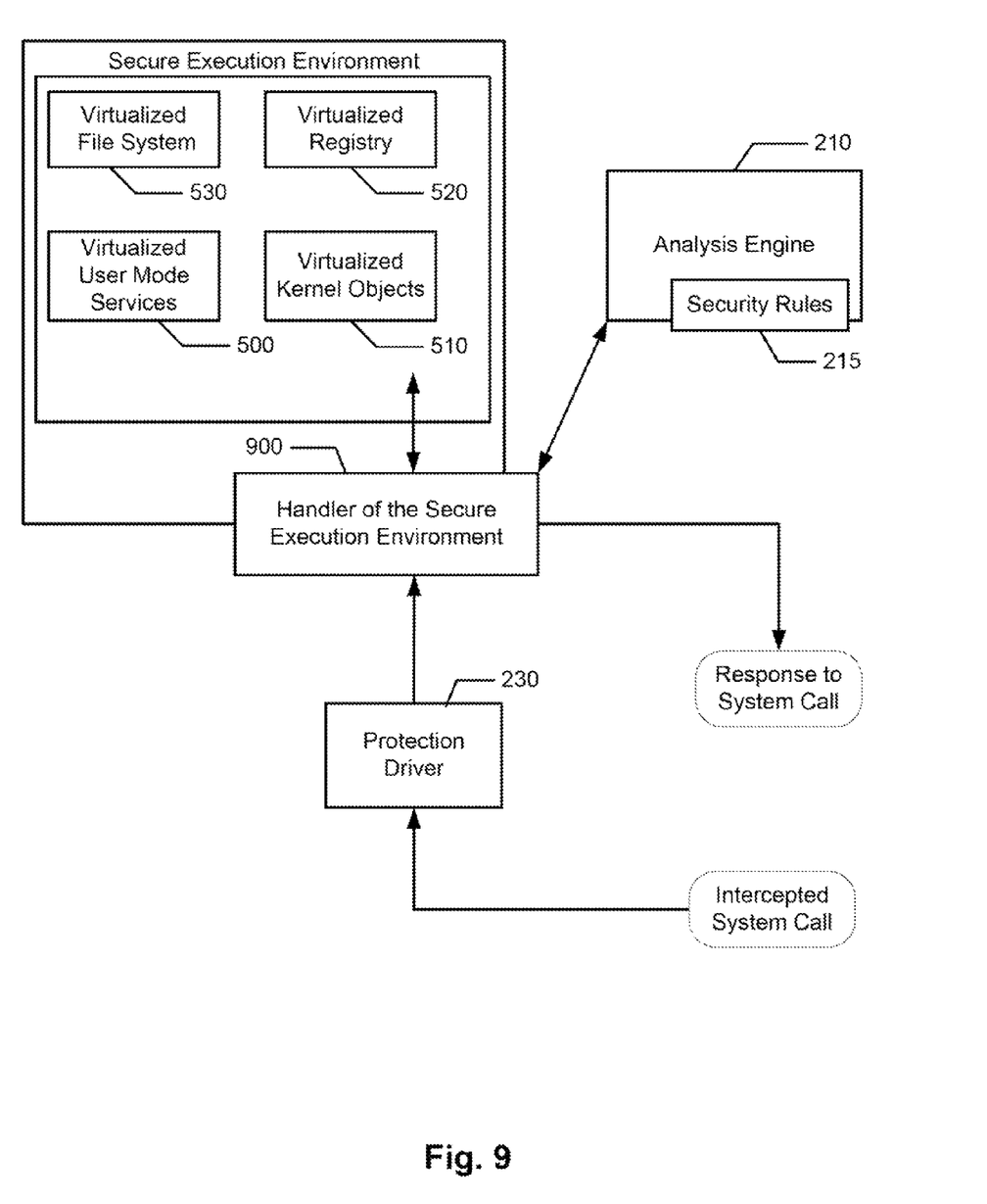
FIG. 9 illustrates a schematic diagram of the malware protection system according to one example embodiment.

FIG. 9 illustrates a schematic diagram of the malware protection system according to one example embodiment. The kernel-level protection driver 230 intercepts system calls. Examples of interceptable requests are described above. The intercepted system calls are redirected to the SEE 900, where virtualization of protected application objects and host system components takes place. If the system call includes a request for a critical object with limited access, a virtualized copy of that object may be created and returned to the program which originated the request. As depicted, the virtualized objects may include but not limited to the user mode services 500, OS kernel 510, OS registry 520, and file system 530. In addition to the constraints imposed by the SEE on the critical system objects, the SEE includes analysis engine 210 configured to analyze system call for presence of security threats using security rules 215 as described above. In one example embodiment, the analysis engine 210 may implement a security rating algorithm in which security rules assess and assign security ratings to the intercepted system calls as disclosed in greater detail in a commonly owned U.S. Pat. No. 7,530,106 entitled "System and Method for Security Rating of Computer Processes", which is incorporated by referenced herein. On the basis of the assigned security ratings the analytical engine 210 can make a decision whether to perform, block or virtualize the intercepted system call as described in great detail hereinabove with reference to FIGS. 7 and 8.

FIG. 10 illustrates one example embodiment of a computer system 5, such as a personal computer (PC) or an application server, suitable for implementing the host computer. As shown, computer system 5 may include one or more processors 15, memory 20, one or more hard disk drive(s) 30, optical drive(s) 35, serial port(s) 40, graphics card 45, audio card 50 and network card(s) 55 connected by system bus 10. System bus 10 may be any of several types of bus structures including a memory bus or memory controller, a peripheral bus and a local bus using any of a variety of known bus architectures. Processor 15 may include one or more Intel® Core 2 Quad 2.33 GHz processors or other type of general purpose microprocessor.

System memory 20 may include a read-only memory (ROM) 21 and random access memory (RAM) 23. Memory 20 may be implemented as in DRAM (dynamic RAM), EPROM, EEPROM, Flash or other type of memory architecture. ROM 21 stores a basic input/output system 22 (BIOS), containing the basic routines that help to transfer information between the components of computer system 5, such as during start-up. RAM 23 stores operating system 24 (OS), such as Windows® XP Professional or other type of operating system, that is responsible for management and coordination of processes and allocation and sharing of hardware resources in computer system 5. System memory 20 also stores applications and programs 25, such as services 306. System memory 20 also stores various runtime data 26 used by programs 25 as well as various databases of information about known malicious and safe objects.

Computer system 5 may further include hard disk drive(s) 30, such as SATA magnetic hard disk drive (HDD), and optical disk drive(s) 35 for reading from or writing to a removable optical disk, such as a CD-ROM, DVD-ROM or other optical media. Drives 30 and 35 and their associated computer-readable media provide non-volatile storage of computer readable instructions, data structures, databases, applications and program modules/subroutines that implement algorithms and methods disclosed herein. Although the exemplary computer system 5 employs magnetic and optical disks, it should be appreciated by those skilled in the art that other types of computer readable media that can store data accessible by a computer system 5, such as magnetic cassettes, flash memory cards, digital video disks, RAMs, ROMs, EPROMs and other types of memory may also be used in alternative embodiments of the computer system.

Computer system 5 further includes a plurality of serial ports 40, such as Universal Serial Bus (USB), for connecting data input device(s) 75, such as keyboard, mouse, touch pad and other. Serial ports 40 may be also be used to connect data output device(s) 80, such as printer, scanner and other, as well as other peripheral device(s) 85, such as external data storage devices and the like. System 5 may also include graphics card 45, such as nVidia® GeForce® GT 240M or other video card, for interfacing with a monitor 60 or other video reproduction device. System 5 may also include an audio card 50 for reproducing sound via internal or external speakers 65. In addition, system 5 may include network card(s) 55, such as Ethernet, WiFi, GSM, Bluetooth or other wired, wireless, or cellular network interface for connecting computer system 5 to network 70, such as the Internet.

In various embodiments, the algorithms and methods described herein may be implemented in hardware, software, firmware, or any combination thereof. If implemented in software, the functions may be stored as one or more instructions or code on a non-transitory computer-readable medium. Computer-readable medium includes both computer storage and communication medium that facilitates transfer of a computer program from one place to another. A storage medium may be any available media that can be accessed by a computer. By way of example, and not limitation, such computer-readable medium can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave are included in the definition of medium.

In the interest of clarity, not all of the routine features of the embodiments are shown and described herein. It will be appreciated that in the development of any such actual implementation, numerous implementation-specific decisions must be made in order to achieve the developer's specific goals, and that these specific goals will vary from one implementation to another and from one developer to another. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of limitation, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various embodiments disclosed herein encompass present and future known equivalents to the known components referred to herein by way of illustration. Moreover, while embodiments and applications have been shown and described, it would be apparent to those skilled in the art having the benefit of this disclosure that many more modifications than mentioned above are possible without departing from the inventive concepts disclosed herein.

What is claimed is:

1. A method for protecting applications deployed on a host computer, the method comprising:
intercepting, at kernel level of the host computer, system calls addressed to an object of a protected application deployed on the host computer;
determining if there is a security rule associated with one or more of the intercepted system call, the object of the protected application, and the actions allowed on the object of the protected application, wherein the security rule indicates at least whether the system call is allowed to be executed or not allowed to be executed on the host computer;
if there is a security rule indicating that the system call is allowed to be executed on the host computer, executing the system call on the host computer;
if there is a security rule indicating that the system call is not allowed to be executed on the host computer, blocking execution of the system call on the host computer;
if there is no security rule associated with the system call, executing the system call in a secure execution environment using a virtual copy of the object of the protected application;
analyzing whether changes to the virtual copy of the object of the protected application present any security threat to the application, application data, or the host computer;
if the changes to the virtual copy of the object do not present any security threat, applying the changes to the real object in the host computer; and
if the changes to the virtual copy of the object present a security threat, blocking execution of the system call on the host computer.

2. The method of claim 1, wherein analyzing whether changes to the virtual copy of the object present any security threat comprises: performing one or more of heuristic analysis, malware signature matching, and behavior analysis of at least the virtual copy of the object.

3. The method of claim 1, wherein the secure execution environment is implemented as a user-mode service on the host computer.

4. The method of claim 1, wherein the secure execution environment further comprises: one or more virtual user mode services, one or more virtual kernel objects, virtual registry, and virtual file system of the host computer.

5. The method of claim 1, wherein intercepting system calls further comprises: intercepting system calls by a kernel-level driver.

6. The method of claim 1 further comprises:
intercepting a remote procedure call from an application deployed on the host computer; and
replacing a port name of an object addressed by the remote procedure call with a port name of a virtual copy of the objected in the secure execution environment, thereby redirecting the remote procedure call to the secure execution environment.

7. A system for protecting applications deployed on a host computer, the system comprising:
a kernel-level driver stored in a memory of the host computer and being executable by a processor of the host computer, the kernel-level driver being configured to intercept system calls addressed to an object of a protected application; and
an analysis engine executable by the processor, the analysis engine being configured to:
determine if there is a security rule associated with one or more of the intercepted system call, the object of the protected application, and the actions allowed on the object of the protected application, wherein the security rule indicates at least whether the system call is allowed to be executed or not allowed to be executed on the host computer;
if there is a security rule indicating that the system call is allowed to be executed on the host computer, instruct the host computer to execute the system call;
if there is a security rule indicating that the system call is not allowed to be executed on the host computer, instruct the host computer to block execution of the system call;
if there is no security rule associated with the system call, instruct a handler of a secure execution environment of the host computer to execute the system call in the secure execution environment using a virtual copy of the object of the protected application;
analyze whether changes to the virtual copy of the object of the protected application present any security threat to the application, application data, or the host computer;
if the changes to the virtual copy of the object do not present any security threat, instruct the host computer to apply the changes to the real object in the host computer; and
if the changes to the virtual copy of the object present a security threat, instruct the host computer to block execution of the system call on the host computer.

8. The system of claim 7, wherein analyzing whether changes to the virtual copy of the object present any security threat comprises: performing one or more of heuristic analysis, malware signature matching, and behavior analysis of at least the virtual copy of the object.

9. The system of claim 7, wherein the secure execution environment is implemented as a user-mode service on the host computer.

10. The system of claim 7, wherein the secure execution environment further comprises: one or more virtual user mode services, one or more virtual kernel objects, virtual registry, and virtual file system of the host computer.

11. The system of claim 7, wherein the kernel-level driver further configured to:
intercept a remote procedure call from the user-mode application; and
replace a port name of an object addressed by the remote procedure call with a port name of a virtual copy of the object in the secure execution environment, thereby redirecting the remote procedure call to the secure execution environment.

12. A computer program product embedded in a non-transitory computer-readable storage medium, the computer-readable storage medium comprising computer-executable instructions for protecting applications deployed on a host computer, the instructions for:
intercepting, at kernel level of the host computer, system calls addressed to an object of a protected application deployed on the host computer;
determining if there is a security rule associated with one or more of the intercepted system call, the object of the protected application, and the actions allowed on the object of the protected application, wherein the security rule indicates at least whether the system call is allowed to be executed or not allowed to be executed on the host computer;

if there is a security rule indicating that the system call is allowed to be executed on the host computer, executing the system call on the host computer;

if there is a security rule indicating that the system call is not allowed to be executed on the host computer, blocking execution of the system call on the host computer; and if there is no security rule associated with the system call, executing the system call in a secure execution environment using a virtual copy of the object of the protected application;

analyzing whether changes to the virtual copy of the object of the protected application present any security threat to the application, application data, or the host computer;

if the changes to the virtual copy of the object do not present any security threat, applying the changes to the real object in the host computer; and if the changes to the virtual copy of the object present a security threat, blocking execution of the system call on the host computer.

13. The product of claim 12, wherein instructions for analyzing whether changes to the virtual copy of the object present any security threat include instructions for: performing one or more of heuristic analysis, malware signature matching, and behavior analysis of at least the virtual copy of the object.

14. The product of claim 12, wherein the secure execution environment is implemented as a user-mode service on the host computer.

15. The product of claim 12, wherein the secure execution environment further comprises: one or more virtual user mode services, one or more virtual kernel objects, virtual registry, and virtual file system of the host computer.

16. The product of claim 12, wherein instructions for intercepting system calls further comprises instructions for intercepting system calls by a kernel-level driver.

17. The product of claim 12 further comprises instructions for:

intercepting a remote procedure call from an application deployed on the host computer; and replacing a port name of an object addressed by the remote procedure call with a port name of a virtual copy of the objected in the secure execution environment, thereby redirecting the remote procedure call to the secure execution environment.

\* \* \* \* \*